(No Model.)

L. WAGNER.
EXPANSIBLE BUNG.

No. 517,781. Patented Apr. 3, 1894.

WITNESSES:
A. O. Babendreier
J. Parker Davis

INVENTOR:
Louis Wagner
By Chas. B. Mann
Atty

UNITED STATES PATENT OFFICE.

LOUIS WAGNER, OF BALTIMORE, MARYLAND.

EXPANSIBLE BUNG.

SPECIFICATION forming part of Letters Patent No. 517,781, dated April 3, 1894.

Application filed April 15, 1892. Renewed June 17, 1893. Serial No. 478,006. (No model.)

*To all whom it may concern:*

Be it known that I, LOUIS WAGNER, a citizen of the United States, residing at Baltimore city, in the State of Maryland, have invented certain new and useful Improvements in Expansible Bungs, of which the following is a specification.

This invention relates to an improved expansible bung for beer kegs and similar receptacles.

The object is to provide a bung which will fit different sized bung-holes, and may be readily tightened therein, and also relaxed for removal when desired.

To this end the invention consists in the novel features of construction and combinations of parts hereinafter described.

The invention is illustrated in the accompanying drawings, in which—

Figure 1:
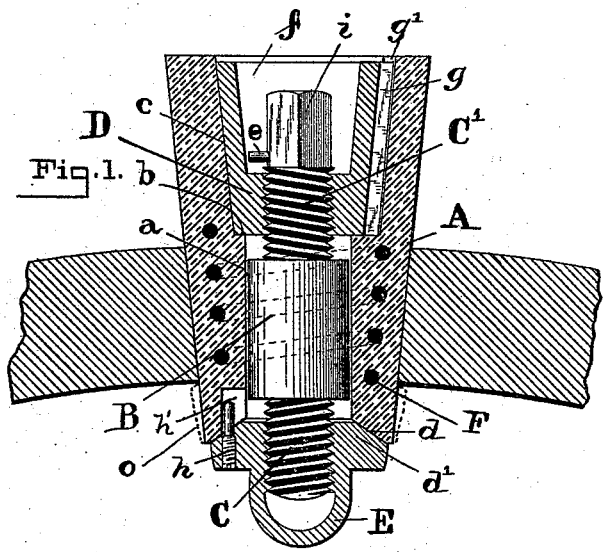
Figures 2, 3:
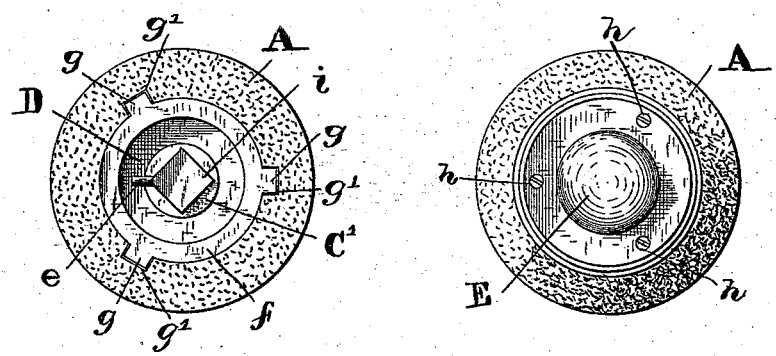
Figure 4:
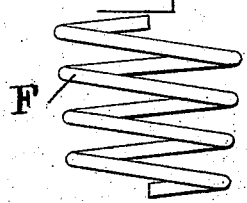

Figure 1 shows a section view of the bung inserted in the bung-hole of a keg. Fig. 2 shows a view of the outer end of the bung. Fig. 3 shows a view of the inner end of the bung. Fig. 4 shows a detail of a spiral spring which is embedded in the rubber plug.

The letter, A, designates a tapered hollow rubber plug which has a cylindrical bore, $a$, a portion of its length and a shoulder, $b$, at the outer end of this cylindrical bore. The interior wall of this rubber plug beyond said shoulder is tapered, as at, $c$, to correspond with the exterior. The inner end of the plug has a conical seat, $d$. A stem, B, fits the bore, $a$, and has both end-portions, C, C', screw-threaded as shown,—one having a right-hand and the other a left-hand thread. A nut, D, is screwed on the outer end of the stem and fits against the shoulder, $b$; this nut has an annular flange, $f$, fitting the tapered interior wall, $c$, and extending nearly to the outer end of the hollow rubber plug to give it stability at that part. Longitudinal ribs, $g$, are formed on the exterior of the flange, $f$, and engage grooves, $g'$, in the rubber plug, to prevent the nut from turning at the same time permitting it to move longitudinally of the hollow-plug. A cap-nut, E, is screwed on the opposite or inner end of the stem and has a conical part, $d'$, fitting the seat, $d$. Screws, $h$, extend through the cap-nut, E, into sockets, $h'$, in the rubber plug and prevent the cap-nut from turning therein, but allow it to move longitudinally. The outer end of the stem is squared as at, $i$, to receive a wrench or similar tool for turning it.

The bung, thus constructed, is inserted into the bung-hole as shown in Fig. 1, and a wrench applied to the square-end, $i$. A slight turn of the stem will draw the cap-nut inward on the thread, C, forcing the conical part, $d'$ upon the seat, $d$. At the same time the nut, D, at the opposite end is forced inward upon the shoulder, $b$. The result of these two nuts being thus drawn toward each other is obviously an expansion of the rubber in the bung-hole. The central cylindrical part of the stem, B, fills the cylindrical bore of the plug, A, and prevents the latter from collapsing under this pressure; the result is an expansion of the inner end of the plug over the inner edge of the bung-hole as illustrated by broken lines, $o$, in Fig. 1. By applying the wrench to turn the stem in the opposite direction the nuts are moved outward from each other and the bung relaxes and may be readily removed. A pin, $e$, projecting from the square-end, $i$, of the stem prevents the latter being turned sufficiently to allow the cap-nut to become detached.

It will be seen a bung of this construction may be fitted to holes of various sizes, and may be very readily tightened therein and also relaxed and removed.

By my construction of a stem with two oppositely threaded end-portions each carrying an expanding nut, a very slight turn of the stem will suffice to expand or contract the bung, as both the nuts advance or recede on the stem toward or away from each other at once; in a construction where a single nut screws on the end of a stem which has a head at the opposite end and only the one thread, it is obvious twice the movement is required to tighten or release the bung as only one nut travels on the stem. By my construction a fraction of a turn of the stem will be sufficient to tighten or release the bung. The arrangement of a double - ended oppositely-threaded stem carrying a nut on each end, thus greatly expedites the use of an expansible bung.

I have shown a spiral spring, F, embedded in the rubber plug, A, to supply elasticity in case the rubber becomes non-elastic after a period of use. This spring will be found advantageous but may be dispensed with, and my invention is not limited to its use.

Having thus described my invention, what I claim as new, and desire to secure by Letters Patent, is—

1. A bung comprising a hollow tapered elastic plug having a conical seat at one end and an internal shoulder near the other end; a stem extending through said plug and having oppositely threaded end-portions; a nut on one of said end-portions and fitting against the conical seat; and a nut on the other of said end-portions and fitting against the internal shoulder.

2. A bung comprising a hollow tapered elastic plug having a conical seat at one end and an internal shoulder near the other end; a stem extending through said plug and having oppositely threaded end-portions; a nut on one end fitting the conical seat; and a nut on the opposite end fitting against the internal shoulder and having ribs which engage grooves in the hollow plug for the purpose described.

3. A bung comprising a hollow tapered elastic plug; means for expanding the same in the bung-hole; and a spiral spring embedded in the said plug.

4. In a bung the combination with a hollow expansible sleeve of suitable elastic material such as rubber, of spreading or expanding devices within and near the inner and outer ends of the same, means for forcing said devices together, and a spring situated intermediately between said spreading devices for elongating and restoring the proper shape to the elastic sleeve, substantially as set forth.

In testimony whereof I affix my signature in the presence of two witnesses.

LOUIS WAGNER.

Witnesses:
A. O. BABENDREIER,
JNO. T. MADDOX.